C. C. MORGAN.
WATER FILTER.
No. 189,771.  Patented April 17, 1877.
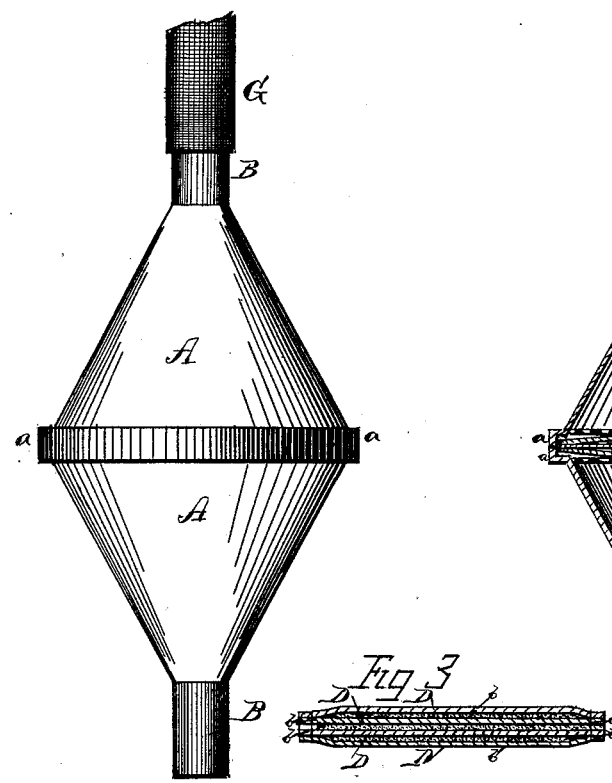
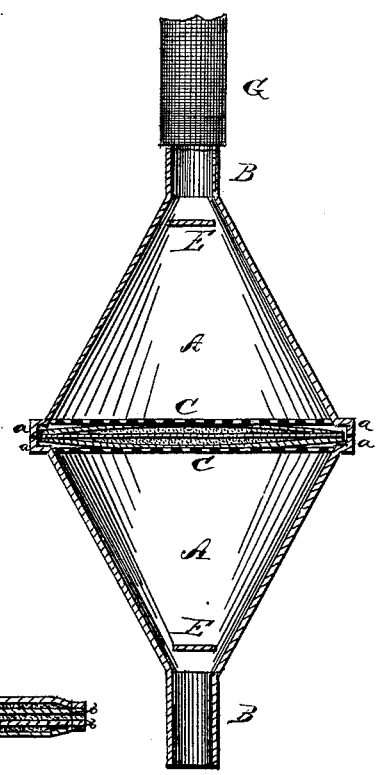
Witnesses
Inventor
C. C. Morgan.
per T. H. Alexander & Co.
Attorneys

UNITED STATES PATENT OFFICE.

CURTIS C. MORGAN, OF CINCINNATI, OHIO, ASSIGNOR TO HIMSELF, JOHN HEYL, AND VALENTINE HEYL, OF SAME PLACE.

IMPROVEMENT IN WATER-FILTERS.

Specification forming part of Letters Patent No. 189,771, dated April 17, 1877; application filed March 3, 1877.

*To all whom it may concern:*

Be it known that I, CURTIS C. MORGAN, of Cincinnati, in the county of Hamilton and State of Ohio, have invented certain new and useful Improvements in Water-Filters; and I do hereby declare that the following is a full, clear, and exact description thereof, reference being had to the accompanying drawings, and to the letters of reference marked thereon, which form part of this specification.

The nature of my invention consists in the employment of asbestus for filtering purposes; in the construction of a filtering-pad, and in the general construction of a filter for hydrants as will be hereinafter more fully set forth.

In order to enable others skilled in the art to which my invention appertains to make and use the same, I will now proceed to describe its construction and operation, referring to the annexed drawing, in which—

Figure 1 is a side view of my filter, and Fig. 2 is a vertical section, and Fig. 3 is a section of the filtering-pad.

The outside casing of my filter is composed of two funnel-shaped parts, A A, each provided at the apex with a short tube, B, and having at the larger end circumferential flanges $a$ $a$, which are united together in any suitable manner to be perfectly water-tight. In this central enlarged portion of the filter case are secured two perforated diaphragms, C C, between which the filtering-pad is placed. This filtering-pad is composed of layers $b$ $b$ of asbestus, placed between pads D D, of felt or other suitable similar material, and sewed together at or near the edges. The whole pad is then placed between the perforated diaphragms C C, and the two funnels A A united together.

To prevent the action of the water sagging and wearing out the pad, and in order to further protect the pad, each section of the filter-case is provided with a piece of tin, E, soldered across the inside thereof, to act as a breakwater, breaking the force of the stream and spreading the water out evenly over the surface of the perforated diaphragm, and over the pad.

This filter is to be attached direct to the hydrant by means of rubber tubing G, connecting the nozzle of the hydrant with one of the tubes B. After drawing through from one side until it begins to clog, the filter is reversed by placing the under part at the top, whereby, by turning on the water, all the accumulated dirt is washed out by filtering from the other side.

By using asbestus as a filtering material all impurities or foreign substances in the water are removed, and the water rendered as pure as spring-water.

Having thus fully described my invention, what I claim as new, and desire to secure by Letters Patent, is—

1. The breakwaters E E, arranged within the filtering-case A A, for the purposes herein set forth.

2. The combination of the case A A with tubes B B, the perforated diaphragm C C, pad D $d$, and breakwaters E E, all substantially as and for the purposes herein set forth.

In testimony that I claim the foregoing as my own I affix my signature in presence of two witnesses.

CURTIS C. MORGAN.

Witnesses:
JOHN HEYL,
HANSON LITTON.